March 21, 1967     S. PATT     3,309,951
MACHINE TOOL TURNING HEAD Filed Sept. 15, 1964     4 Sheets-Sheet 1

INVENTOR.
SYLVESTER PATT
BY
McNenny, Farrington, Pearne & Gordon
ATTORNEYS

March 21, 1967 S. PATT 3,309,951
MACHINE TOOL TURNING HEAD
Filed Sept. 15, 1964 4 Sheets-Sheet 2

INVENTOR.
SYLVESTER PATT
BY
McNenny, Farrington, Pearne & Gordon
ATTORNEYS 3,309,951
MACHINE TOOL TURNING HEAD
Sylvester Patt, Willoughby, Ohio, assignor to The Patt Brothers Company, Willoughby, Ohio, a corporation of Ohio
Filed Sept. 15, 1964, Ser. No. 396,489
16 Claims. (Cl. 82—35)

This invention relates to the machine tool metal turning art and, more particularly, to a novel turning head for accurately cutting different diameters repetitively.

The prior art

Heretofore, when it was desirable to cut a step on a shaft or turn a shaft to a specific diameter, it has been one common practice to chuck shaft stock in a lathe and engage the stock with a lathe cutting tool. This required a rough cut and one or more finish cuts, involving manually setting and resetting the tool and checking with a micrometer until the proper diameter was obtained. If multiple steps on a single shaft were necessary, this same time-consuming process was repeated. Inefficiency, by the amount of time required, is self-evident.

It will also be evident that in a production operation where, for example, thousands of identical stepped shafts were to be produced, the above procedure would be very time consuming and an expensive way of conducting the operation. One of two procedures would be necessary:

(1) The tool would have to be reset several times for each shaft. This would produce variations from shaft to shaft, because the operator would never set the tool exactly from shaft to shaft or from diameter to diameter.

(2) On the other hand, the job could be accomplished by setting one step diameter size and chucking each of the thousand shafts to cut this portion. This means that each shaft would have to be chucked four different times, if four steps were cut on it. The expense of proceeding in this manner is obvious.

Further, in the above process, the stock is turned rather than held steady or fixed. There are many instances where it would be desirable to hold a part fixed and cut the step or shaft diameter on it. Often, assembled pieces of equipment require shafts or pinions to be cut on them; and these need to be stepped, to receive bearings, etc. This cannot be done conveniently on a lathe unless the work can be rotated in the lathe.

Therefore, a substantial advance to the art would be provided by a turning head that is capable of cutting exactly repetitive and differing diameters; wherein the stock can either be rotated or held fixed; and wherein the diameters are pre-programmed so that upon simple movement of a lever, a change from one diameter to another can be set at will and be reproduced to exact micrometer accuracy.

Objects of the present invention

It is, therefore, an important object of the present invention to provide a novel machine tool turning head wherein multiple step diameters can be readily selected and such diameters are preset or pre-programmed, so that when a diameter is selected, its exact duplication is always assured.

A further object is to provide a novel machine tool turning head for multiple shaft sizes utilizing a novel tool holding mechanism as a component thereof.

A further object is to provide a novel machine tool turning head wherein rollers are employed in combination with the cutting edge to hold long shafts against whipping and to hold the work against the cutting tool and, additionally, burnish the machined surface, so that a dual finishing operation is provided in one pass.

A still further object of the invention is to provide a machine tool turning head embodying a plurality of stops that can be readily set to a very high degree of micrometer accuracy.

A further object is to provide a machine tool turning head that can rotate while the work is held fixed, or that can be held fixed while the work is turned and fed to it.

A still further object is to provide a machine tool turning head which embraces a shaft so that it is capable of machining very long shafts to a high degree of accuracy by supporting the shaft against whip.

A further object is to provide a novel machine tool turning head embodying biasing or support rollers of unique design that cooperate with the cutting edge tool to assure accuracy.

Other objects of this invention appear in the following description and appended claims, reference being made to the accompanying drawings forming a part of this specification, wherein like reference characters designate corresponding parts in the several views.

Illustrative embodiments of the invention

As will appear from the drawings and the following description of the invention, the invention comprises the following principal components:

(1) a frame with an axial bore through which the workpiece is inserted. The frame carries work support rolls and a cutting tool operable relative to the bore.

(2) A relatively movable cam ring mounted around the frame. Support rolls and a cutting tool are biased outwardly and carry cam followers to engage the cam ring. Movement of the cam ring sets the work rollers and cutting tool at radial working positions in accordance with the diameter to be produced.

(3) An abutment mechanism carried by the cam ring cooperating with a system of stops which establishes the amount of movement of the cam and therefore automatically sets the support rollers and cutting tool to selected radial working positions.

(4) A tool holder and work support roll mechanisms.

The frame comprises a shank 20 and a body 22. These are united as one for operation of the device. The shank 20 (FIGURE 4) includes a circular body mounting disk 24. An annular flange 26 extends around the periphery of this unit. The free edge of the flange 26 extends above the inside surface 28 of the disk 24. This provides a shallow cup-like recess into which the tool and roller support body 22 can be cradled.

The disk 24 is provided with an axially extending bore 30. A tubular projection or shank portion 32 extends axially from the disk 24. The bore 30 is common to both the disk 24 and the tubular extending shank portion 32. The purpose of the bore is to receive a shaft workpiece as indicated schematically in FIGURE 2. As will become evident, an important advantage of this tool is that it can traverse an extremely long shaft and at the same time support the shaft at the working position along its length to prevent whip, and this without auxiliary support means.

The tool and roller support body 22 is actually a short cylinder, but of annular configuration. The external diameter is a few thousandths of an inch less than the internal diameter of the annular flange 26 of the shank member 20. This provides a clearance for purposes of alignment between the body 22 and the shank 20, as will become evident. An axial bore 34 is also formed in this unit so that when assembled as shown in FIGURE 4, this bore and the bore 30 of the shank 20 are in alignment to receive a shaft in the manner previously discussed.

Figure 4:
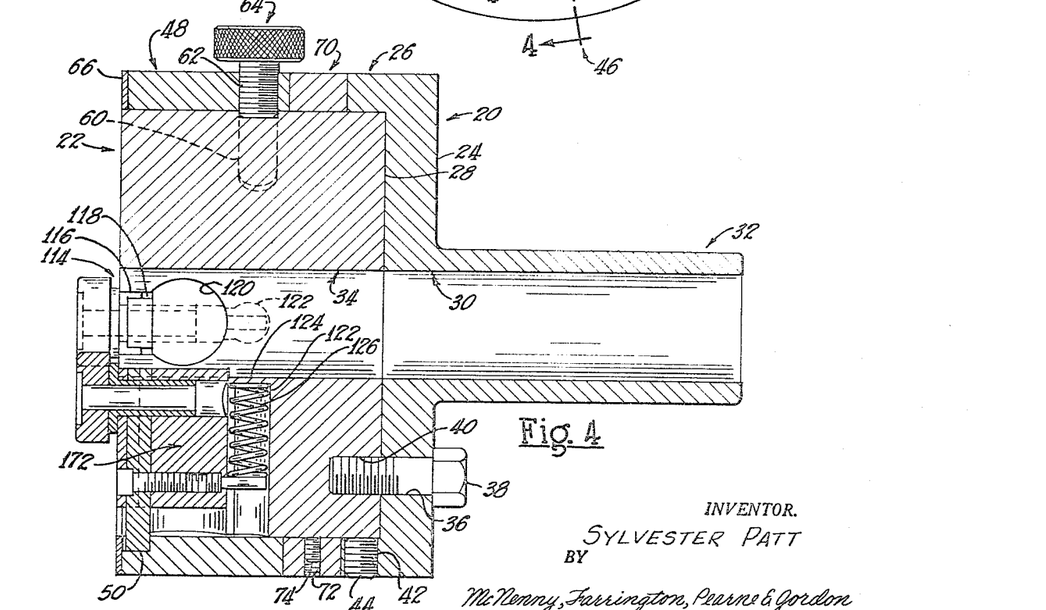
FIGURE 4 is a sectional view taken along the line 4—4 of FIGURE 3.

As shown in FIGURE 4, a hole 36 is drilled through the disk 24 in parallel, axial alignment to the axis of the unit. Although FIGURE 4 does not show it, there are two of these holes, one on each side of the unit. The holes 36 are about one-sixteenth inch diameter larger than the shank of bolts 38. This permits relative movement between the shank 20 and body 22, for axial alignment. Tapped holes 40 are drilled into the back side of body 22 in alignment with holes 36, in order to receive the threaded ends of the bolts 38. When the bolts 38 are firmly tightened, the body 22 and the shank 20 are immovably locked to one another.

As shown in FIGURE 4, a tapped hole 42 is run transversely through the annular flange 26 of the shank 20. Although not shown by the drawings, there are four of these at 90° intervals around the flange 26. The four locations are indicated by the reference arrows 46 in FIGURE 3. Setscrews 44 are run into the holes 42 to abut the outside of body 22. By adjusting these screws, body 22 can be axially aligned exactly with shank 20. Then bolts 38 are tightened to retain the alignment of the parts.

Figure 1:
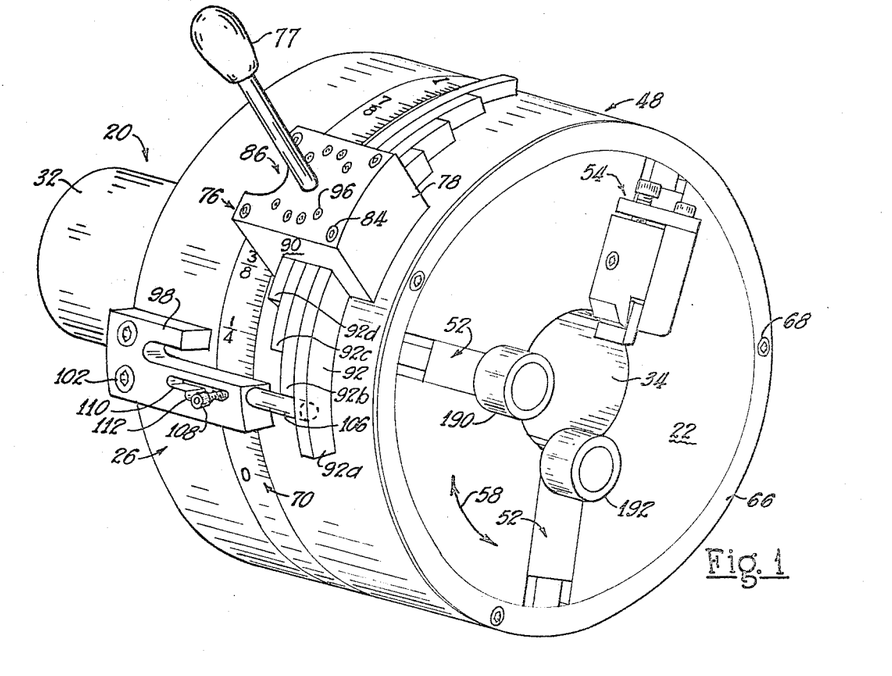
FIGURE 1 is a perspective view of the tool of invention in its entirety.
Figure 3:
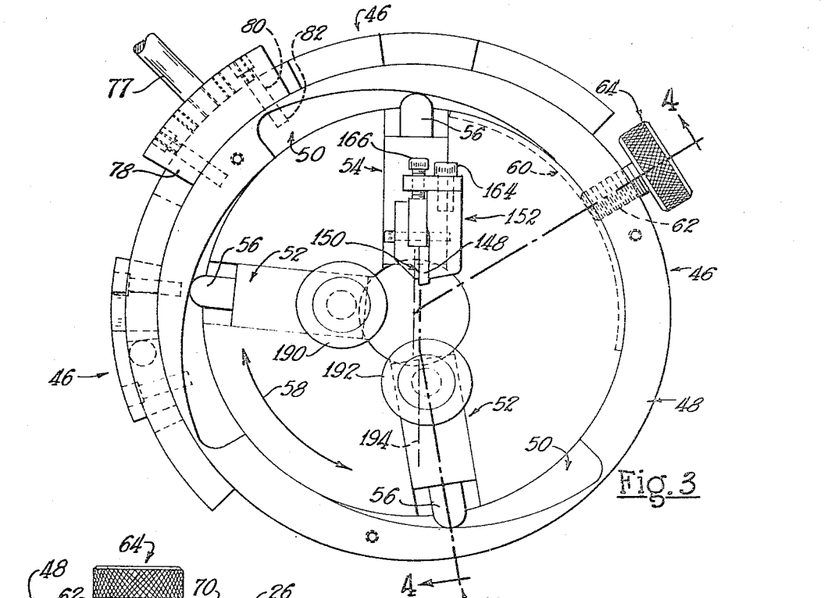
FIGURE 3 is a front elevational view of the tool holder of invention with the cam cover ring removed to show the interior profile of the cam ring.

The cam ring is designated 48 in FIGURES 1, 3, and 4, and is of annular configuration. As indicated in FIGURE 4, the cam ring has an inside diameter a few thousandths larger than the outside diameter of the tool and roller support body 22 for movement relative to the body 22. As shown in FIGURE 3, three separate cam slots 50 are machined into the exposed end to provide adjustment of the two work support roller carriages 52 and the tool holder carriage 54.

Each of the roller carriers 52 and the tool carrier 54 include a cam follower end 56 that is adapted to "ride" the profile of a respective cam surface 50. Turning the cam ring 48 in a counterclockwise direction (FIGURE 3) causes the roller carriages 52 and the work support carriage 54 to move radially inwardly. Clockwise movement of the cam ring 48 results in the opposite radial movement. A spring is provided to bias each of carriers 52, 54 outwardly so that the follower ends 56 ride the cam surfaces 50. These springs are described later, one being shown at 126 in FIGURE 4. Therefore, as the cam follower ends 56 engage the cam surfaces 50, the work diameter is automatically set.

Axial relationship between the annular cam ring 48 and tool and roller support body 22 is provided as follows:

As shown in FIGURES 3 and 4, a 90° slot 60 is formed along the outer periphery of body 22. A tapped hole 62 is formed transversely through the wall of the cam ring 48, and the threaded shank of an adjusting knob 64 is run into the tapped hole and into slot 60. By tightening the knob 64, the cam ring 48 is locked in place. If it is desired to move the cam ring, the knob 64 is backed off a bit for such purpose. However, it remains within the slot 60, and this preserves the relative axial position of parts 48 and 22. It will however be noted that easy removal for cleaning or repair is provided by simply loosening the handle 64 further, so that part 48 can be slipped off to the left, as viewed in FIGURE 4.

In order to keep dirt and chips out of contact with the cam surfaces 50, a retainer or protection ring 66 is applied, as shown in FIGURES 1 and 4. Three appropriate holes are formed into both the ring 66 and the cam ring 48 and flat head screws 68 applied. The purpose of ring 66 is not only to keep out chips but, as shown at the bottom, lower left portion of FIGURE 4, to retain accurately the cam follower ends in positive contact and alignment with the cam surfaces 50.

A graduated setting ring or scale ring 70 is shown in FIGURES 1 and 4. This is of annular configuration and has an inside diameter a few thousandths of an inch larger than the outside diameter of tool and roller support body 22, so as to be movably mounted on the outside thereof. For purposes of setting up the tool, this setting ring must be adjustable. Therefore, as shown at the bottom of FIGURE 4, it is provided with a transversely tapped hole 72 which receives an Allen head screw 74. It will be noted, referring to FIGURE 4, that the total axial length of the retainer or protection ring 66, annular cam ring 48, and graduated setting ring 70 is such as to bring the ring 66 flush with the end surface of the tool and roller support body 22.

Figures 5, 6, 7, 8, 9, 10, 11, 12, 13, 14:
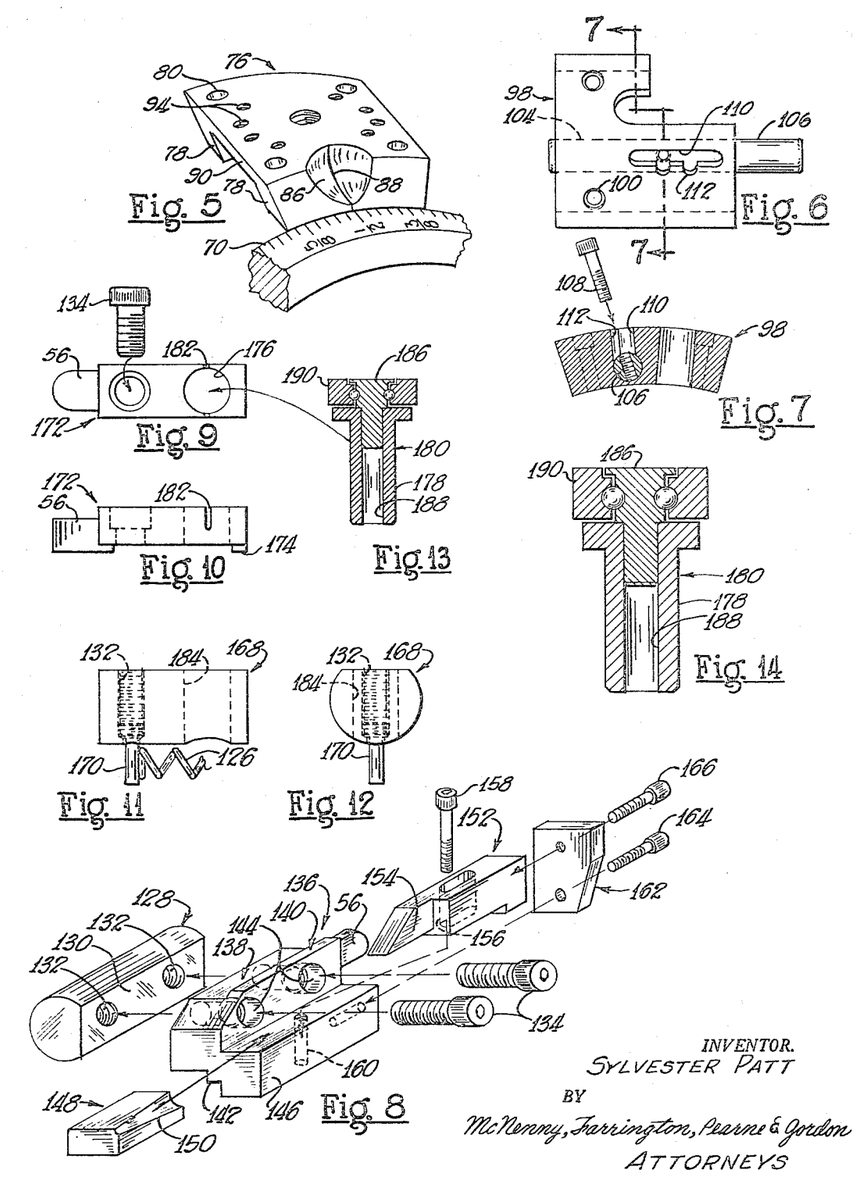
FIGURE 5 is a perspective view of the stop holder, as shown at the top of FIGURE 1, but looking at the holder from the other side.
FIGURE 6 is a top plan view of the adjustable abutment pin mechanism for the stops, also shown at the left of FIGURE 1.
FIGURE 7 is a sectional view along the line 7—7 of FIGURE 6.
FIGURE 8 is an exploded, perspective view of one form of a tool holder.
FIGURE 9 is a top plan view of a roller clamp and cam follower.
FIGURE 10 is a side elevational view of FIGURE 9.
FIGURE 11 is a side elevational view of the roller support slide to which is attached the clamp of FIGURES 9 and 10.
FIGURE 12 is an end elevational view of FIGURE 11.
FIGURE 13 shows the clamp bolt and roller, oriented relatively to FIGURES 9, 10, and 11; this view exploding the clamp bolt and roller away from the clamp of FIGURES 9 and 10 and the body of FIGURE 11.
FIGURE 14 is an enlarged axial sectional view of the roller of FIGURE 13 showing constructional details more clearly.

The purpose of the setting ring 70 is to provide a reference scale for setting the cutting tool to a selected diameter, either with or without the stops. When the stops are set to correspond to certain diameters on the setting ring, repeat cuts using the stops will always be the same. However, when the stops are not used, the tool can be set visually, using the line 88 on the base of the handle 77 for diameters other than those set by the stops. FIGURE 5 showing the relationship of the reference line 88 to the scale 70. Thus, the versatility of the tool of invention includes operation either with or without the stops as desired.

An important aspect of the invention is the mechanism for setting the cutting tool to various pre-selected diameters. Referring to FIGURES 1 and 5, a body member 76 of generally U-shaped section is fastened to the exterior surface of the annular cam ring 48. This member 76 has the ends of arms 78 contoured to the same curvature profile as the exterior of the cam ring 48. Bolt holes 80 (FIGURE 3) run through the arms 78 at each end thereof, and aligned tapped holes 82 are formed in the outer surface of the cam ring 48. Bolts 84 (FIGURE 1) suitably of Allen head, are applied to retain the parts in assembled relationship.

For visual setting and checking, as shown in FIGURE 5, an index line 88 is provided. To place line 88 close to the scale of the graduated setting ring 70, metal is removed to form a shallow recess 86. The line 88 is engraved in the recess 86 and thus is near the scale of ring 70 for accurate optical alignment with the scale.

The bight portion 90 of the stop holder 76 embraces a plurality of arcuately shaped and elongated stop rods 92. In this particular embodiment of the invention, four such stop rods are shown, 92a, 92b, 92c, and 92d. However, the extended scope of invention includes a plurality, meaning more than two. The stop rods are locked in place as follows: One or more holes 94, tapped to receive flat Allen head screws 96, are provided in appropriate alignment through the bight portion 90. In the embodiment shown, there are two such screws 96 used for the purpose of setting or holding each of the stop members 92.

The stop members 92 are of rectangular section and longitudinally curved to match the exterior profile of the cam ring 48. Since the stop holder 76 straddles these members, it will be evident that when the screws 96 are tightened down, the stop rods 92 are held in place between the stop holder 76 and the exterior of the annular cam ring 48. The total width of the four stop holders shown is such that their combined widths substantially fill the space between the arms 78 of the stop holder 76 but without binding. Therefore, the stop members 92 are retained in side-by-side relation and in parallel alignment by being so embraced. By appropriately setting these members to diameters in accordance with the index line 88 shown in FIGURE 5, operating diameters of an increasing step nature can be provided. In order to move the cam ring, a handle 77 is provided as indicated in FIGURE 1. To move the handle, of course, the lock knob 64, FIGURE 4, must be loosened.

The abutment mechanism which engages the stop members 92 is shown in FIGURES 1, 6, and 7. A body member 98 has two holes 100 (FIGURE 6). As shown in FIGURE 1, these receive Allen head screws 102 that are run into appropriate holes formed in the flange 26 of shank 20 to hold the unit in position. The body 98 is provided with a longitudinally extending bore 104 (FIGURE 6) to slidably receive a stop rod member 106. As shown in FIGURE 7, the stop rod member is provided with a transversely extending tapped hole to receive a setting handle in the form of a fluted head screw 108. The body 98 is provided with an elongated slot 110 in alignment with the central part of the bore 104 to receive the setting member 108.

Referring to FIGURES 1 and 6, the slot 110 has closed ends and, additionally, two notches 112 along one side. This total structure comprises four stop points corresponding in number to the four stop rods 92. The right hand end (as viewed in FIGURES 1 and 6) establishes a position where the stop member 92a abuts a top side of stop rod 106. The two notches 112 establish positions where the stop members 92b and 92c abut a top side of rod 106. The left hand end of slot 110 establishes a position where the stop member 92d abuts a top side of rod 106. By having previously set the stop members 92a, 92b, 92c, and 92d, for example, for one-quarter, one-half, three-quarters and one-inch diameters, respectively, those diameters can be quickly selected and the cutting tool set without the use of a micrometer and at the will of a machine operator. Other exemplary ranges of settings embraced within the particular embodiment of the invention shown are as follows:

(a) ⅛ inch to ¾ inch; and
(b) ½ inch to 1½ inches.

FIGURE 4 shows an end profile view of one of the guideways 114 in the body 22 in which both the tool holder and the roller carriers operate. A guideway 114 includes three levels wherein the top level is a groove 116. At the bottom and along each side of this groove are opposed shoulders 118. Between the shoulders 118, there remains an opening providing access to a semicircular, elongated recess 120 therebelow. Beneath the recess 120, there is semicircular recess 122. This forms a spring well, as shown by the side view recess 122 of FIGURE 4. The sub-recess 122 does not extend into the bore 34, but stops by a thin wall 124. Against this wall 124, a biasing spring 126 is abutted. This biases the carriers outwardly as previously mentioned.

As shown in FIGURE 8, a tool carrier 54 includes a cylindrical slide member 128 having a flat 130 along the side thereof. Two bolt holes 132 are provided through this body to receive bolts 134. The contour of this slide member 128 is such that it slidably fits within the circular recess 120, FIGURE 4.

The tool holder body 136 has a recessed portion 138 that is of a width to fit between the shoulders 118. Ledges 140 and 142 are formed above the recess portion 138 of a width to form a sliding fit in the groove portion 116, shown in FIGURE 4. Bolt holes 144 receive the bolts 134, and tightening of the bolts secures the slide member 128 and the tool holder body 136 together in operable alignment to move back and forth in a slideway system 116, 118, 120, and 122 (FIGURE 4). At the bottom of one of the holes 132, there is fitted an Allen screw with a pin the projects downwardly from the bottom of slide member 128 to abut a spring carried in the spring well 122, the same as spring 126 in FIGURE 4. The pin is in the bottom of the rightmost hole 132 in FIGURE 8, and therefore is at the back end of the body. Thus, the spring 126 always urges the tool holder assembly 54 outwardly. The Allen screw with the pin is as illustrated in FIGURE 11 and there designated 170. The top of the tool holder body 136 is of L-shaped configuration with an upstanding wall portion 146. This supports the tool, and clamp and adjusting members therefor, as will now be described.

The tool is designated 148 in FIGURE 8. A cutting lip 150 is formed along the exposed edge. This rests along the forward portion of the wall 146 as indicated. A clamp member 152 is bolted to wall 146 in overlying relationship to the tool 148 to hold it in place. The clamp member 152 has a narrow nose portion 154, so that it overlies the upper surface of the tool 148 without covering the cutting lip 150. The clamp member 152 has a bolt hole 156 to receive a bolt 158, and the bolt 158 passes into a hole 160 in wall 146. The manner of assembly is evident from FIGURES 1, 3, and 8. It should be pointed out that for purposes of fine adjustment of the cutting tool, the hole 156 in clamp 152 may be elongated or of oval shape.

An adjusting screw plate 162 is fastened by means of a bolt 164 to the back side of the wall portion 146. An adjusting screw 166 is passed through an upper hole in plate 162 to engage the back surface of clamp member 152. With the bolt 158 loosened, fine adjustments of the cutting edge 150 can be made for establishing exact diameters to be produced. Assembled views of the tool holder and its mounting on the turning head are shown in FIGURES 1 and 3. Also, the manner in which the adjusting screw 166 functions, and the manner in which the tool 148 is held are shown clearly in these views. The cam follower end 56 is shown in FIGURES 3 and 8. This is made as a part of the tool holder body 136.

A roller carrier 52 is shown in FIGURES 9, 10, 11, 12, 13, and 14. A slide member 168 is used, like the slide member 128 of FIGURE 8, except that the two holes formed therethrough are slightly different to receive a bolt and the shank of a roller support, respectively. One hole 132 is provided at the rear end to receive a bolt 134; and an Allen screw carrying a pin 170 is placed beneath the bolt 134. This pin 170 abuts the spring 126 as shown in FIGURE 4. Thus, the spring always forces the slide member 168 outwardly.

On top of the slide member 168, there is positioned a cam follower and roller clamp member 172. This is of a width to fit the groove 116 shown in FIGURE 4 and is stepped underneath to fit between the shoulders 118, so that the bottom surface in the form of the tabs 174 can rest on top of the slide member 168 when the parts are assembled.

A hole 176 is formed through this element to receive the shank 178 of a tubular roller support 180. The slide member 168 is also bored in alignment with the hole 176 as at 184. The shank 178 extends through the hole 176 and into the bore 184. Because of the flats 174 and slots 182, when the bolt 134 is applied as indicated and tightened, the center of the cam follower and roller clamp member 172 are caused to bow downwardly very slightly. This clamps the top portion of the metal of body 172 surrounding hole 176 against the shank 178 and locks it in place. The cam follower end 56 is shown at the left of FIGURES 9 and 10.

In enlarged view, the roller detail is shown in FIGURE 14. A roller shank 186 is press-fitted into the bore 188 that extends axially of shank 178. The upper surface of the shank 186 includes a bearing cone surface with a ball recess peripherally therearound. Around this there is fitted the roller body 190, mounted for rotation by means of the ball bearing elements indicated.

In certain applications, an extremely fine degree of tool adjustment is required. Additionally, a tool wears slightly during prolonged use, so that again a very fine adjustment of the tool position may be needed. The tool holder or carrier of FIGURES 15 and 16 embodies a fine vernier or scale feature for adjustably mounting the tool.

Referring to these figures, the tool holder includes an irregularly shaped tool block 206 of general L configuration. The leg portion of the block 206 has a depressed channel 208 through which an elongated opening 210 extends. A threaded holding 212 reaches inwardly from the rear of the block 206, as viewed in FIGURE 15. The stem portion of the L-shaped block 206 has a rearwardly extending follower 214 and an upwardly extending ledge 216. This follower and ledge perform the same function and purpose as the follower 56 and ledge 140 of the embodiment of FIGURE 8. A transverse opening 218 in the stem portion passes an Allen head bolt 220 to engage a threaded opening of a slide member (not shown) which can be identical to the slide member 128 of FIGURE 8.

Figure 15:
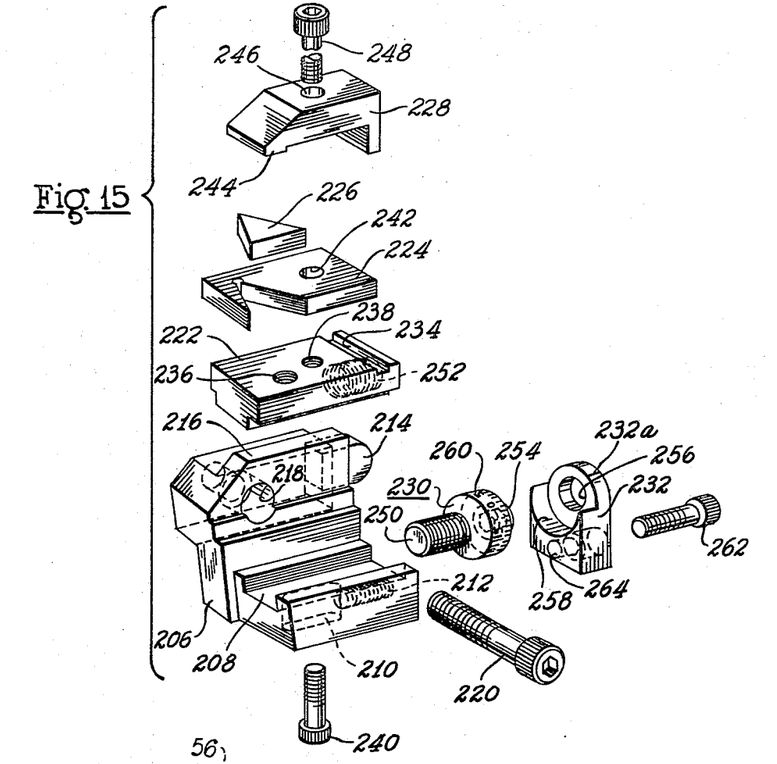
FIGURE 15 is an exploded, perspective view of another form of tool holder.
Figure 16:
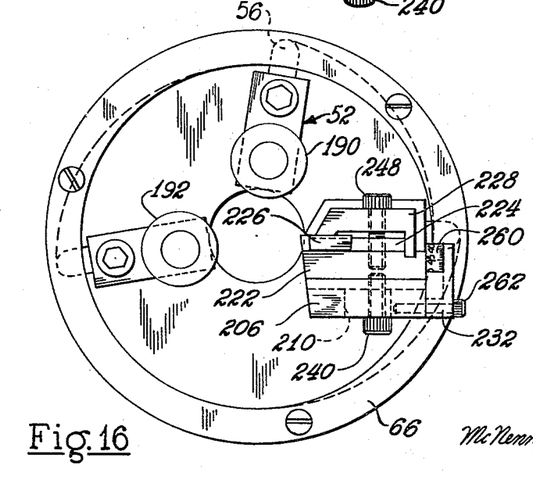
FIGURE 16 is a front elevational view of a turning head showing the parts of the tool holder of FIGURE 15 in assembly.

Arranged atop the leg portion of block 206 is superposed fashion are a tool anvil 222, a tool support plate 224 for a tool 226, and a clamp 228. Rearwardly of the block as viewed in FIGURE 15 are an adjusting bolt generally indicated at 230 and a back plate 232.

More particularly, the tool anvil 222 is of general T cross-section, the short stem of the T matching and riding within the channel 208 of the block 206. At one end, the anvil has a transverse slot 234 and, more centrally, a pair of threaded openings 236 and 238. At least the former extends downwardly through the anvil 222 to receive a bolt 240 through the oblong opening 210. The bolt 240 pulls the anvil 222 against the bottom of the channel 208 and therefore assists in holding the anvil in place at a number of adjustable positions along the length of the channel.

The tool support plate 224 has an opening 242 and a triangular cut-out to receive therein a similarly shaped tool 226 which, for example, may be cemented tungsten carbide. The clamp 228 is L-shaped, the leg portion extending downwardly to engage the transverse slot 234 of the tool anvil. The main portion of the clamp 228 has a lip 244 to grip the forward end of the tool support plate 224. An opening 246 is aligned with the opening 242 of the tool support plate and the threaded opening 238 of the tool anvil to receive an Allen head bolt 248 which thereby secures the indicated parts in tight assembly.

The adjusting bolt 230 includes a threaded shank 250, which engages a threaded, rearward opening 252 in the tool anvil 222, and a stub shaft 254 which nests within an opening 256 in the back plate 232. The plate 232 also has a concave recess 258 to match and receive the head 260 of the adjusting bolt. An Allen head bolt 262 secures the back plate 232 to the tool block 206 by passing through an opening 264 in the back plate and into the threaded opening 212 of the tool block.

The head 260 of the adjusting bolt 230 is suitably calibrated. For example, the circumference of the head may be graduated in thousandths of an inch, so that one full turn of the head 260 moves the bolt 230 longitudinally 0.050 inch. The scale of the head 260 may be read in registry with a line 232a engraved on the back plate 232; or cooperating vernier scales may be used on the bolt head and arch of the back plate, respectively. In use, it is necessary only to loosen bolt 248 and bolt 240 (if the latter is used) and turn the head 260 of the adjusting bolt. This action propels the tool anvil 222 forwardly or backwardly along the channel 208 a very slight amount and simultaneously similarly moves the tool support plate 224 and tool 226 to provide the fine degree of adjustment desired.

FIGURE 3 illustrates the manner in which the mechanism operates. The cutting edge 150 of the tool 148 is on a level slightly above the center of the opposed roller 192. This is designated by the reference line 194. The second roller carrier 52 is positioned about midway between the tool carrier 54 and the opposed first roller carrier 52. Thus, the three slideway mechanisms are about 90° apart, occupying about 270° of the work face of body 22.

Assuming that stock is fed into the unit from the exposed end of FIGURE 1, it will be understood that the cutting edge 150 establishes the diameter. As soon as a small lip is on the stock, of even a thousandth of an inch or so, the lip lies on the inner surface of the rollers 190 and 192, and a supported position of the stock is thus established. It is to be understood that the rollers 190 and 192 and the inside tip of the cutting lip 150 are on an exactly common diameter. Therefore, the work is immediately supported at the exact diameter, and no matter how great a length of shaft is run through the bore 34, there is no whip, because the work is always positively supported at three points where the cut is being made. Further, the work is positively held against the cutting edge so that exact machining is provided at all times.

An additional advantage becomes apparent with the structure shown. Because the work is positively held by the rollers, there is enough force resulting from the cutting to burnish the machined surface as it is developed. Thus, the present invention provides not only a stock removal cut, but it also provides a finish burnish to the stock, all in one pass and on a high speed production basis.

From the foregoing, it will be evident that a number of advantages accrue from the present invention. These include:

(1) A mechanism is provided wherein different diameters can be exactly reproduced and with a burnished finish all in one pass.

(2) The stock is held against whip.

Figure 2:
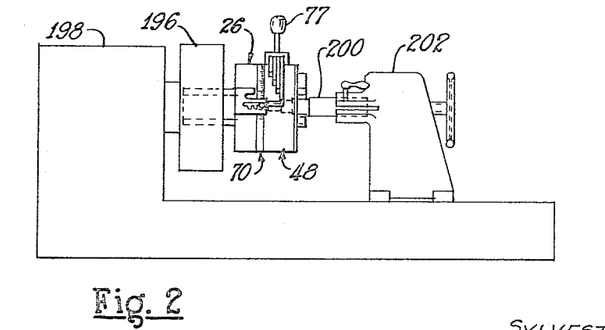
FIGURE 2 is a schematic view illustrating the turning head of invention chucked into a lathe head for rotation, with the workpiece held stationary by the tail stock.

(3) The mechanism is versatile in that it may be used in a variety of conventional machine tools, as follows:

(a) It can be held for rotation by the chuck 196 of a lathe 198, as shown in FIGURE 2. Here, the stock 200 is held fixed in the tail stock 202, so that the tool moves and the stock stays fixed.

(b) It can be held in the tool holder of a lathe or similar metal turning machine and fixed transversely thereto or in axial alignment with the stock which will be chucked in the lathe head. Again, there is relative rotation between the turning head and the stock.

(c) It can be chucked in the tail stock of a lathe.

(4) Different diameters can be readily established by loosening the adjusting or lock knob 64 in FIGURE 3, moving the stop rod 106 for engagement by a selected one of the stop members 92a, 92b, 92c or 92d, moving the cam ring by handle 77 until the abutment is engaged, and then locking the adjusting or lock knob 64. By so operating, exact duplication of diameters is always assured, and it will be noted that the changes from diameter to diameter are rapidly accomplished.

It will be understood that the invention is not limited to the details of construction and arrangement of parts illustrated in the accompanying drawings and described above. It will also be understood that the phraseology or terminology employed above is for the purpose of description and not of limitation.

What is claimed is:

1. In a turner head,
a cylindrical body member having a working face and said face having a geometric center,
radially extending slideway means in said face,
a support roll carrier and a tool carrier slidable respectively in said slideway means and radially of said face,
said carriers each including outwardly extending cam follower means,
means biasing said carriers radially outwardly of said face,
a cam ring movable around said cylindrical body member and having cam surface means engageable with said follower means to simultaneously move said follower means to thereby move said carriers to radial working distances from the center of said face,
an elongated, curved rod-like stop member contoured to conform to the exterior of said cam ring,
a generally U-shaped holder for said stop member mounted on the exterior of said cam ring to embrace said stop member and having means to hold said stop member against the exterior of said cam ring,
an abutment member mounted on the exterior of said cylindrical body member to engage said stop member on movement of said cam ring,
and means for locking said cam ring against movement when placed in an adjusted position.

2. In a turning head,
a body member having a work face with a center and groove means extending radially from the center,
a support roll carrier and a tool carrier slidable in said groove means to move radially of said body and along said work face,
said tool carrier having a tool with a cutting edge exposed outwardly of said work face,
said support roll carrier comprising a slide body with a flat along one side and parallel to the axis,
a slide member supported on said flat at spaced contact points,
said slide body and said slide member being provided with coaxial bores to receive the shank of a roller support and the bore of the slide member being positioned between said spaced contact points,
means for clamping said slide member to said slide body between said spaced contact points so that said slide member is bowed to grip said shank of said roller support,
said carriers each having outwardly extending cam follower means,
means biasing said carriers radially outwardly of said face,
relatively movable cam means carried by said body member and engaging said follower means to establish radial working positions of said carriers,
and means for locking said cam means against movement relative to said body member.

3. In a turning head,
a cylindrical body member having an end work face with radially extending slideway means thereon,
a support roll carrier and a tool carrier slidable in said slideway means to move radially of said body and along said work face,
said tool carrier having a tool with a cutting edge exposed relative to said face of said cylindrical body member,
said support roll carrier comprising a slide body with a flat along one side and parallel to the axis,
a slide member supported on said flat at spaced contact points,
said slide body and slide member being provided with coaxial bores to receive the shank of a roller support and the bore of said slide member being positioned between said spaced contact points,
means for clamping said slide member to said slide body between said spaced contact points, so that said slide member is bowed to grip said shank of said roller support and hold the roller carried by said support outwardly of said work face,
said carriers each having outwardly extending cam follower means,
means biasing said carriers radially outwardly of said face,
a cam ring surrounding said cylindrical body member and movable relative thereto, and having cam surface means thereon engaged by said follower ends to establish radial working positions of said carriers,
and means for locking said cam ring to thereby lock said carriers in operating position.

4. In a machine tool turning head,
a body defining a bore for receiving a work piece and having angularly related guide means extending radially outwardly from the axis of said bore;
a plurality of tool and roller carriers, each associated with and slidable along one of said guide means and each having an outwardly directed cam follower;
means biasing said carrier radially outwardly;
a cam ring coaxially mounted on said body for rotation relative thereto about said axis and having inwardly directed cam surfaces thereon respectively engaging said cam followers for adjustably establishing radial working positions of said carriers upon rotation of the cam ring;
a scale ring coaxially mounted on said body adjacent said cam ring for rotation relative to the body about said axis;
means for releasably locking said scale ring against rotation relative to said body for maintaining a selected reference relationship of the scale ring and body;
means for releasably locking said cam ring against rotation relative to said body and in a selected reference relationship with said scale ring; and
cooperating reference indicia on said cam ring and scale ring for indicating the amount of rotation of the cam ring relative to a selected reference relationship between the scale ring and body.

5. In a machine tool turning head having a continuous axial bore for receiving a work piece,
a tool holding and work supporting body having a working face and a plurality of tool and roller carrying blocks for engaging a tool and support rollers with the work piece, said blocks being mounted on said face on angularly disposed radii thereof for inward and outward adjustment along said radii and having cam followers;
a shank member comprising a tubular shank portion for mounting said turning head on a machine tool;
means for securing said body to said shank against relative rotation, including means for adjusting and maintaining concentricity of said body and shank member;
a cam ring mounted on said body for coaxial rotation relative thereto and having cam surfaces engaging said cam followers for adjustably establishing radial working positions of said blocks by rotation of said cam ring;
means for releasably locking said cam ring and body against relative rotation for maintaining established radial working positions of said blocks;
a scale ring mounted coaxially on said body for rotation relative thereto for adjustably establishing a selected reference relationship of the scale ring and body;

means for releasably locking said scale ring against rotation relative to said body for maintaining a selected reference relationship of the scale ring and body; and a graduated scale and a cooperating reference indicium, one being on said cam ring and the other being on said scale ring for indicating the amount of relative rotation of the cam ring and scale ring.

6. In a machine tool turning head according to claim 5, means mounting a tool on one of said blocks for adjustment generally in a radial direction toward and away from a work piece disposed on the axis of the turning head.

7. In a machine tool turning head according to claim 5, said shank member comprising a body mounting disk having said tubular shank portion extending axially from one end thereof, and said body mounting disk including a cylindrical, peripheral flange extending axially therefrom for receiving and peripherally embracing said body with clearance for concentricity adjustment of the body on the shank member.

8. In a machine tool turning head according to claim 5, said peripheral flange, cam ring, and scale ring all having outer surfaces defining a common cylinder and being disposed one after another in end-to-end juxtaposition.

9. In a machine tool turning head according to claim 5, said shank member comprising a body mounting disk having said tubular shank portion extending axially from one end thereof, and said body mounting disk including a cylindrical, peripheral flange extending axially therefrom for receiving and peripherally embracing said body with clearance for concentricity adjustment of the body on the shank member, said peripheral flange, cam ring, and scale ring all having outer surfaces defining a common cylinder and being disposed one after another in end-to-end juxtaposition; and means for maintaining said end-to-end juxtaposition and for restraining axial movement of said cam ring and scale ring relative to said body and said peripheral flange.

10. In a machine tool turning head having a continuous axial bore for receiving a work piece, a tool holding and work supporting body having a working face and a plurality of tool and roller carrying blocks for engaging a tool and support rollers with the work piece, said blocks being mounted on said face on angularly disposed radii thereof for inward and outward adjustment along said radii and having radially outwardly directed cam followers;

a tubular shank member for mounting said turning head on a machine tool;

means for securing said body to said shank member against relative rotation, including means for adjusting and maintaining concentricity of said body and shank member;

a cam ring surrounding said body for coaxial rotation relative thereto and having inwardly directed cam surfaces for exerting radially inwardly directed forces on said cam followers to adjustably establish radial working positions of said blocks by rotation of said cam ring;

means biasing said blocks radially outwardly to maintain engagement of said cam followers with said cam surfaces;

means for releasably locking said cam ring and body against relative rotation for maintaining established radial working positions of said blocks;

a scale ring surrounding and mounted coaxially on said body for rotation relative thereto for adjustably establishing a selected reference relationship of the scale ring and body;

means for releasably locking said scale ring against rotation relative to said body for maintaining a selected reference relationship of the scale ring and body; and a graduated scale and a cooperating reference indicium, one being on said cam ring and the other being on said scale ring for indicating the amount of relative rotation of the cam ring and scale ring.

11. In a machine tool turning head having a continuous axial bore for receiving a work piece, a tool holding and work supporting body having a working face and a plurality of tool and roller carrying blocks for engaging a tool and support rollers with the work piece, said blocks being mounted on said face on angularly disposed radii thereof for inward and outward adjustment along said radii and having radially outwardly directed cam followers;

means for coaxially mounting said body on a cylindrical support member of a machine tool, including means for adjusting and maintaining concentricity of said body and support member;

a cam ring mounted on said body for coaxial rotation relative thereto and having cam surfaces engaging said cam followers for adjustably establishing radial working positions of said blocks by rotation of said cam ring;

means for releasably locking said cam ring and body against relative rotation for maintaining established radial working positions of said blocks;

a scale ring mounted coaxially on said body for rotation relative thereto and relative to said cam ring for adjustably establishing a selected reference position of the scale ring;

means for releasably locking said scale ring against rotation relative to said body for maintaining an established relationship of relative rotation of said scale ring and body;

a graduated scale and a cooperating reference indicium, one being on said cam ring and the other being on said scale ring, and the two being in juxtaposition for indicating relative rotation of said cam ring and scale ring, whereby rotation of said cam ring relative to said scale ring while the latter is locked in an established reference relationship with said body indicates on said scale a corresponding adjustment of the radial positions of said blocks; and cooperating stop means and abutment means respectively mounted one on said turning head in a fixed location relative to an established reference position of said scale ring and the other for movement with said cam ring, said abutment means including a plurality of abutment members providing respective abutment surfaces for engaging said stop means, said abutment members being independently adjustable circumferentially of said turning head to establish a succession of selected circumferential positions of their respective abutment surfaces, and means for locking said abutment members in different selected circumferential positions for successively establishing different selected radial positions of said blocks when said stop member is successively engaged with said abutment surfaces.

12. In a machine tool turning head according to claim 11, said abutment members being offset one from another along the turning head axis, and said stop means being selectively movable along said axis to engage any one of said abutment means.

13. In a machine tool turning head according to claim 11, said means for coaxially mounting said body on a cylindrical support member including a tubular shank member and means for adjustably maintaining concentricity of said body and shank member, one of said stop means and abutment means being mounted on said shank member and the other being mounted on said cam ring.

14. In a machine tool turning head according to claim 11, said means for coaxially mounting said body on a cylindrical support member comprising a tubular shank, a body mounting disk having said tubular shank extending axially in one direction therefrom, and a cylindrical, peripheral flange extending axially in the opposite direction therefrom for receiving and peripherally embracing said body; one of said stop means and abutment means being mounted on said peripheral flange and the other being mounted on said cam ring.

15. In a machine tool turning head according to claim 11, said means for coaxially mounting said body on a cylindrical support member comprising a tubular shank, a body mounting disk having said tubular shank extending axially in one direction therefrom, and a cylindrical, peripheral flange extending axially in the opposite direction therefrom for receiving and peripherally embracing said body; one of said stop means and abutment means being mounted on said peripheral flange and the other being mounted on said cam ring; said peripheral flange, cam ring, and scale ring all having outer surfaces defining a common cylinder and being disposed one after another in end-to-end juxtaposition.

16. In a machine tool turning head,
a body defining a bore for receiving a work piece and having angularly related guide means extending radially outwardly from the axis of said bore;
a plurality of tool and roller carriers, each associated with and slidable along one of said guide means;
a cam ring coaxially mounted on said body for rotation relative thereto about said axis, said cam ring being associated with said carriers for adjustably sliding them equal distances along their respective guide means in response to rotation of the cam ring;
a scale ring coaxially mounted on said body adjacent said cam ring for retention on the body in a fixed reference relationship therewith;
cooperating reference indicia on said cam ring and scale ring for indicating the amount of rotation of the cam ring relative to a selected reference relationship between the scale ring and body; and
cooperating stop means and abutment means respectively mounted one on said turning head in a fixed location relative to an established reference position of said scale ring and the other for movement with said cam ring, said abutment means including a plurality of abutment members providing respective abutment surfaces for engaging said stop means, said abutment members being independently adjustable circumferentially of said turning head to establish a succession of selected circumferential positions of their respective abutment surfaces, and means for locking said abutment members in different selected circumferential positions for successively establishing different selected radial positions of said blocks when said stop member is successively engaged with said abutment surfaces.

References Cited by the Examiner

UNITED STATES PATENTS

| | | | |
|---|---|---|---|
| 710,174 | 9/1902 | Bedworth | 82—35 |
| 1,032,382 | 7/1912 | Davenport | 82—35 |
| 2,506,012 | 5/1950 | Collins | 82—35 XR |
| 2,513,819 | 7/1950 | Saunders | 82—35 |
| 2,601,716 | 7/1952 | Laningham | 82—35 XR |
| 3,144,795 | 8/1964 | Bunnell | 82—35 |

WILLIAM W. DYER, JR., *Primary Examiner.*

LEONIDAS VLACHOS, *Examiner.*